United States Patent [19]

Lagasse

[11] 4,090,030

[45] May 16, 1978

[54] ANTENNA MOUNT AND CONNECTOR

[75] Inventor: Eugene F. Lagasse, Chester, Conn.

[73] Assignee: Conrac Corporation, New York, N.Y.

[21] Appl. No.: 749,090

[22] Filed: Dec. 9, 1976

[51] Int. Cl.[2] .......................... H01Q 1/32; H01Q 1/12; H01R 17/04; H01R 17/20

[52] U.S. Cl. .............................. 174/153 A; 339/126 J; 339/178; 343/715; 343/906

[58] Field of Search .......... 174/138 A, 152 A, 153 A; 343/711, 713, 715, 749, 790, 791, 888, 892, 900, 901, 906; 339/89 C, 126 J, 178

[56] References Cited

U.S. PATENT DOCUMENTS

| | | | |
|---|---|---|---|
| 2,694,187 | 11/1954 | Nash | 339/178 X |
| 3,054,981 | 9/1962 | Malek et al. | 339/89 C X |
| 3,123,665 | 3/1964 | Ulrich | 174/153 A |
| 3,145,384 | 8/1964 | Nuttle | 343/749 |
| 3,501,738 | 3/1970 | Tolliver | 339/178 |
| 3,944,722 | 3/1976 | Larsen | 343/715 X |

FOREIGN PATENT DOCUMENTS

| | | | |
|---|---|---|---|
| 2,013,631 | 10/1971 | Germany | 343/900 |

*Primary Examiner*—Laramie E. Askin

[57] ABSTRACT

Apparatus for mounting a radio antenna of whip type on a vehicle is improved to permit more convenient and reliable electrical connection of the antenna assembly directly to the coaxial transmission cable. A particular advantage of the improved structure is that installation and connection of the antenna does not require trimming, soldering or otherwise manipulating the cable conductors. Installation of antennas by inexperienced amateurs is thereby greatly facilitated.

3 Claims, 4 Drawing Figures

70 21 92 90 82 34 74 75 72 38 36 30 33 26 28 22 80 29 24 32 68 10 25 12 60 27

108 101 114 112 100 110 92 102 104 38 106 47 33 46 41 26 42 30 40 21 22 24 25 10 44 68 27 60

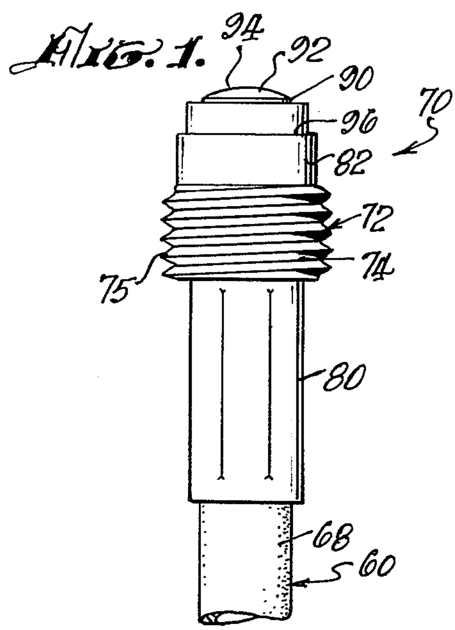
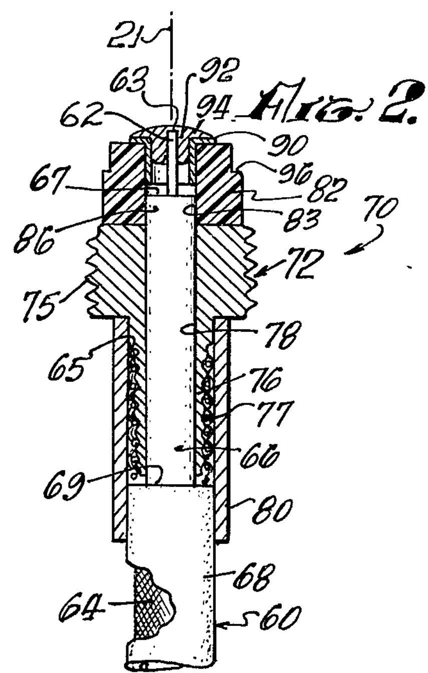
Fig. 3.
Fig. 4.

ANTENNA MOUNT AND CONNECTOR

BACKGROUND OF THE INVENTION

This invention relates generally to the mounting of radio antennas on vehicles, and to the provision of convenient and effective electrical connections for operating such antennas.

The invention is especially, although not exclusively, useful in connection with antennas designed for two-way voice communication at radio frequencies in the so-called Citizen's Band.

Satisfactory installation of CB equipment must meet rather specialized requirements. On the one hand, careful attention to technical details is needed in mounting and connecting the antenna in order to derive maximum benefit from the relatively low value of four watts to which the transmitter output power is limited. On the other hand, due to the rapidly expanding popularity of CB radios among the general public, many sets are bought and installed by amateurs having little facility with tools and only limited understanding of electricity. Accordingly, even a small improvement in the available equipment may prove highly beneficial if it helps an inexperienced purchaser to install his CB antenna in a manner to insure good performance.

The present invention provides improved means for installing and electrically connecting the relatively long coaxial cable that is usually needed to reach from the selected antenna position to the transceiver. That improved coupling mechanism simplifies the installation procedure by eliminating any need for cutting and trimming the cable end, or for soldering the cable conductor and braided shield to respective terminals of the antenna mounting bracket, as is necessary in many previous designs.

Those advantages are obtained without significantly complicating the often difficult task of fishing the coaxial cable through small apertures in the vehicle body, or through the final mounting hole in a body panel at which the antenna bracket is sometimes secured.

OUTLINE OF THE INVENTION

In accordance with one aspect of the present invention, the antenna end of the coaxial cable is provided with a permanently installed terminal fitting with coaxial threads for connection to the antenna mounting bracket. The terminal fitting is so designed that its overall diameter is scarcely larger than the cable diameter itself. Hence, the cable end with its installed fixture can be threaded through available openings in the vehicle body from the location of the transceiver to the selected antenna location with substantially no more difficulty than was experienced in previous practice with a bare cable.

After the cable end with its connector is thus brought to the antenna position, the connector is screwed into mating threads provided on the antenna mounting bracket. That bracket is then mounted on the vehicle, using fastening structures of any type that is suitable for the selected antenna position.

The invention utilizes an antenna mounting bracket of particularly simple and economical construction having screw threads by which the antenna or antenna assembly is securely and accurately positioned on it. An important feature of the invention is the mutually coaxial arrangement of the threads by which the antenna and the cable connector are coupled to the mounting bracket, such that assembly of the antenna on the mounted bracket automatically produces direct electrical contact between the live contact on the antenna or antenna assembly and the live contact on the cable coupling fixture itself. The directness of that contact greatly improves its reliability, both as to initial establishment and permanence of effective service.

A particular feature of the present cable coupling fixture, in addition to its very small overall diameter, is the structurally rigid support provided for the live contact element, especially with respect to axially applied stress. The corresponding contact element on the antenna assembly can then be resiliently mounted with strong axial prestress to insure valid electrical contact without danger of injury to the cable end or to the connector itself.

The invention thus facilitates rapid and fully reliable antenna installation even by inexperienced purchasers, eliminating the need for assembling individual cable conductors to terminal devices, and insuring efficient and durable operation of the mounted antenna.

BRIEF DESCRIPTION OF THE DRAWING

A full understanding of the invention, and of its further objects and advantages, will be had from the following description of an illustrative manner in which it may be carried out, with reference to the accompanying drawing in which:

FIG. 1 is an elevation representing a preferred form of coaxial cable terminal fitting for carrying out the invention.

FIG. 2 is an axial section corresponding to FIG. 1;

FIG. 3 is an axial section at smaller scale than FIGS. 1 and 2 representing an illustrative antenna mounting bracket in accordance with the invention, assembled in typical relation on a vehicle panel member with a cable terminal fitting in operating position;

FIG. 4 is an axial section corresponding to FIG. 3, but including an illustrative bracket protective shell and with an illustrative base loaded antenna assembly mounted in operative relation to the coaxial cable.

DESCRIPTION OF PREFERRED EMBODIMENT

In the present illustrative antenna mounting system, the primary structural unit is the unitary bracket member 22. Bracket member 22 is of general cup form with the axis 21, and includes the rim 24, the relatively flat floor portion 26, and the boss 30 which projects coaxially from the outer surface of floor portion 26. The cup is mounted in inverted position on any desired support, represented in the drawings by the generally horizontal panel section 10 which may comprise a portion of the vehicle roof, rear deck or the like. An access aperture 12 is provided in panel section 10 at approximately the desired position of bracket axis 21. As typically shown, bracket member 22 is secured to panel 10 by a plurality of screws 28, which work in the angularly spaced, radially slotted holes 29 and operate the conventional hook structures 27. Those structures extend through aperture 12 and engage the inner face of panel 10. The generally circular bracket rim 24 is typically separated from the outer panel surface by the sealing and protective gasket 25.

Bracket boss 30 is provided with the coaxial through bore 32, which has an inwardly facing internal shoulder 34 close to its upper and outer end. The bore is provided with the internal threads 36 inwardly of shoulder 34 for connection of the cable coupling fixture, to be described. A second set of coaxial threads 38 on the external surface of boss 30 opens outwardly in position to receive the threads 104 of an antenna assembly, which typically comprises the antenna base 100 and the antenna proper 108.

Coaxial cable 60 for connecting the antenna and transceiver typically comprises the central live conductor 62, preferably stranded for increased flexibility, and the surrounding ground conductor 64, typically of braided copper. The live and ground conductors are separated by the relatively thick annular sheath 66 of high quality solid dielectric material. The outer protective cover 68 of tough flexible insulating material normally has an outer diameter of about 3/16 inch.

In accordance with the invention, the antenna end of cable 60 is equipped with a connector of the preferred type shown at 70. That structure comprises the ground terminal member 72, the retaining ferrule 80, the annular insulator 82 and the small flanged sleeve 90 which may comprise a commercially available metal eyelet of suitable size. Terminal member 72 includes the body portion 74 with the external threads 75 adapted to mate with bracket threads 36, already described, and the elongated, externally corrugated sleeve portion 76. The uniform axial through bore 78 is of suitable diameter to slip over insulating cable sheath 66. Insulator 82 is provided with the axial through bore 83 of that same diameter. Ferrule 80 is formed of metal suitable for crimping, and has an inner diameter that fits freely over the intact cable.

To install terminal fitting 70 on the cable end, the cable is first trimmed to accurately predetermined dimensions as typically indicated in FIG. 2, with cover 68 cut squarely at 69, braid 64 at 65, insulating sheath 66 at 67 and live conductor 62 at 63. Ferrule 80 is then slipped over the cable end and down out of the way. The exposed braid 64 is loosened and ground terminal 72 is slipped over sheath 66 with its sleeve portion 76 inserted beneath the braid, which is then pressed down into uniform contact with the sleeve corrugations 77. The end of insulating sheath 66 then typically projects from terminal member 72 by approximately the relative distance shown at 86 in FIG. 2. Ferrule 80 is then brought into the position shown, with its outer end against the terminal member body and its inner end surrounding an end portion of the cable cover. Conventional crimping of the ferrule (FIG. 1) then securely clamps terminal member 72 mechanically to the cable and electrically to the cable braid. Threads 75 of terminal member 72 thereby form the ground contact of the terminal fitting.

In accordance with the present invention, the live contact of the terminal fitting is formed by slipping insulator 82 over the exposed end at 86 of cable sheath 66 into abutment with the outer end of ground terminal member 72. The sleeve portion of the eyelet 90 is then inserted in the open end of insulator bore 83 with its flange portion supported on the flat outer end face of the insulator. With the eyelet in that position, a drop of solder 92 is flowed into the narrow annular space within the eyelet and surrounding the end portion of live cable conductor 62. The solder preferably embeds the conductor end and covers virtually the entire outer surface of the eyelet flange, forming a slightly rounded live contact surface 94 for the terminal fitting. That contact surface 94 is reliably insulated from the ground terminal, and has the particular advantage that it is firmly supported mechanically by insulator 82 in coaxial alignment and in accurate axial relation to the threaded body portion 74 of the terminal fitting.

The present invention further provides at the outer portion of insulator 82 of the terminal fitting the outwardly facing shoulder 96. The outer diameter of the insulator beyond that shoulder is selected to fit freely within the axially outer portion of bore 32 of the antenna mounting bracket 22, already described. As the terminal fitting is threaded into bracket bore 22, as in FIG. 3, the axial position of the fitting within the bracket is positively defined by contact of terminal shoulder 96 with inwardly facing bracket shoulder 34. Moreover, in practice the slight inherent resilience of insulator 82 retains the terminal fitting securely in that defined position even when the threaded connection is made only finger tight, greatly facilitating the assembly process.

That assembly of cable and bracket member is typically made after the cable end and connector have been fished through panel aperture 12 and while the bracket member is still unmounted and freely rotatable to mate the threads 36 and 75. The connected bracket member is then rigidly mounted on panel 10 and gasket 25 by operation of the mounting screws 28 and hooks 27 or equivalent mounting mechanism. The structure at that stage of assembly is shown illustratively in FIG. 3.

The antenna mounting assembly is then typically completed by addition of the shield 40 and its retaining nut 46. The shield is not required to perform any structural function, but conceals bracket member 22 and its mounting structure, preventing unauthorized disassembly of the bracket unless retaining nut 46 is first removed. The shield may be shaped and externally finished to give a desired quality of appearance to the completed bracket structure.

Shield 40 typically comprises a simple cup configuration with the flat, centrally apertured base portion 41 and the rim 44. Shield aperture 42 slips freely over threads 38 of bracket boss 30, and may accurately fit an unthreaded base portion of the boss. The shield position is further defined by the three pedestals 33, formed integrally on the bracket member radially opposite the respective slots 29 for the mounting screws. The shield is retained in firm engagement with those pedestals by the flat retaining nut 46, which typically works on boss threads 38 and is provided with suitable recesses 47 in its upper face for receiving a wrench of special design. Shield rim 44 is then in substantially the same plane as bracket rim 24 and similarly engages sealing gasket 25.

The antenna assembly typically comprises the antenna base 100, which may include conventional loading coil, not explicitly shown, for tuning the effective frequency of the antenna. The antenna proper is mounted on base 100 in conventional manner and may be of any desired construction. Antenna base 100 is typically enclosed in a nonconductive housing 101 of suitable plastic in which is embedded a conductive support member 102 coaxially bored and threaded at 104 to mate with threads 38 of bracket member 22. The antenna base preferably has a flat lower face 106 adapted to abut the upper face of nut 46, cooperating with the mounting threads to rigidly define the effective axis of the antenna base and hence of the antenna itself. A live antenna contact 110 is resiliently mounted within base 100, as by the spring 112, for yielding movement along the axis of symmetry of the base structure. A flexible conductor 114 typically connects contact 110 in known manner to the loading coil within the base. The ground connection to the loading coil is made in any suitable manner from support member 102.

With the described illustrative structure the antenna assembly then can conveniently be assembled on bracket 22 or disassembled as desired with assurance that live contact 110 of the antenna base will reliably make proper and firm contact to the surface of contact 92. Since contact 92 comprises an integral part of terminal fixture 70 and is directly connected electrically to live conductor 62 of cable 60, the antenna is electrically connected in direct and reliable manner to the cable itself without possibility of any intermediate coupling mechanisms becoming disengaged and interfering with fully effective antenna operation.

Thus, the invention provides an extremely simple and economical mechanism for mechanically mounting an antenna assembly on an apertured vehicle panel member and for insuring a fully effective and reliable electrical operation of the antenna. The described structure of cable terminal fixture 70 provides firm and rigid support of live terminal contact 92 with respect to mounting threads 75. Hence that contact surface can withstand even abnormally heavy pressure from the resiliently mounted antenna contact 110 without possibility of injuring live cable conductor 62, even if the latter is composed of relatively fine stranded wire. Furthermore, the initial installation on cable 60 of the specially designed terminal fixture 70, with maximum diameter approximating that of the cable itself, facilitates threading of the antenna end of the cable through even a very intricate series of apertures in the vehicle body and enables even an inexperienced purchaser to make effective connection of the cable to the antenna bracket without difficulty or risk of error.

I claim:

1. Apparatus for mounting a whip antenna assembly on a panel member of a vehicle body at a mounting aperture in the panel member and for electrically connecting the antenna assembly to a radio transceiver or the like at a remote body position, said antenna assembly including coaxial mounting threads and a live electrical contact having an axially facing contact surface; said apparatus comprising a bracket member having a through bore and including coaxial threads at the outer end of the bore for receiving said mounting threads to mount the antenna assembly, the bore having internal threads which open axially inward and are closed outwardly by an inwardly facing annular shoulder, means actuable from outside said panel member for mounting the bracket member on the panel member with the inner end of the bore approximately aligned with the mounting aperture, a flexible coaxial cable including an axial live conductor, an outer ground conductor, and a sheath of solid insulation between the conductors, an electrical terminal fitting mounted on one end of the cable and comprising an externally threaded conductive ground terminal member surrounding the cable insulation sheath and electrically engaging the cable ground conductor, an annular dielectric support coaxially abutting the outer end of the ground terminal member, and a live terminal contact with axially facing contact surface directly connected electrically to the live cable conductor and mechanically supported independently of that conductor on the outer end of the dielectric support in positively defined, axially spaced relation to the ground terminal member, the threads of the ground terminal member being receivable in said internal threads of the bracket bore with the dielectric support engaging said annular shoulder to position the live terminal contact for directly engaging the live antenna contact upon mounting of an antenna assembly on the bracket member, said terminal fitting having a maximum diameter approximating the cable diameter, whereby the cable and its mounted terminal fitting are readily fished from said remote body position through apertures in the vehicle body and through said mounting aperture in the panel member for screw threaded connection with an unmounted bracket member.

2. Apparatus according to claim 1 wherein said bracket member is of general cup form with said through bore opening outwardly through a coaxial boss on the exterior of the cup, said coaxial threads being formed on the exterior of the boss, and said inwardly facing shoulder being formed closely adjacent the outer end of the boss.

3. Apparatus according to claim 2, including also a centrally apertured shield of general cup form adapted to be mounted on the boss of a mounted bracket member for enclosing and concealing the bracket member.

* * * * *